Patented Oct. 16, 1923.

1,470,968

UNITED STATES PATENT OFFICE.

STAPLETON D. GOOCH, OF PLANT CITY, FLORIDA.

PROCESS OF PRODUCING FERTILIZER.

No Drawing. Application filed August 19, 1921. Serial No. 493,714.

*To all whom it may concern:*

Be it known that I, STAPLETON D. GOOCH, a citizen of the United States, residing at Plant City, in the county of Hillsborough and State of Florida, have invented certain new and useful Improvements in Processes of Producing Fertilizers; and I do hereby declare the following to be a full, clear, and exact description of the invention, such as will enable others skilled in the art to which it appertains to make and use the same.

The invention relates to a method or process of producting fertilizers, and more particularly to the production of monocalcium phosphate by treating phosphatic material, such for example as phosphates, phoshatic matrix or phosphatic clays with phosphorous pentoxide.

To this end the primary object of my invention, generally considered, is to produce a soluble acid phosphate by directly subjecting phosphate rock, preferably in a finely powedered form, to hot phosphorous pentoxide.

Another object of the invention is to treat phosphate rock by subjecting the same to phosphorous pentoxide as produced by the so-called volatilization process in the reduction of phosphatic materials.

A still further object of my invention is to produce a double superphosphate by directly treating ground phosphate rock with the hot acid fumes derived by the volatilization of phosphatic material either in an electric or a fuel burning furnace.

A still further object of the invention is to produce an acid phosphate fertilizer by directly subjecting phosphatic material to the hot acid fumes derived from the volatilization of phosphatic material in the presence of a reducing agent, the phosphatic material while treated being agitated so as to condense or entrain therein the phosphoric acid gas.

Other objects of the invention will hereinafter more fully appear from the following description of my invention.

It has been customary in the manufacture of commercial phosphatic fertilizers for the operators of the phosphate mines to screen the mined phosphatic material and to discard all such material as will pass through a 3/64 inch mesh. The reclaimed material, that is, that portion of the material which will not pass through this dimension mesh, is shipped to the fertilizer manufacturer who produces the commercial acid phosphate by treating this ground phosphatic material with sulphuric acid.

By my method I avoid and render unnecessary the treatment of the phosphatic material with sulphuric acid and am also enabled to advantageously utilize the heretofore wasted material in the production of monocalcium phosphate.

In the method or process which I have devised the phosphatic material, such as phosphate rock, phosphatic matrix or phosphatic clays, are preferably finely ground and are placed in a suitable retort or chamber and are there agitated in a convenient manner in an atmosphere of heated phosphorous pentoxide. The agitation of the phosphatic material in the presence of this heated gas entrains or absorbs a large percentage of this gas in a soluble form within the phosphatic material which is then collected and is suitable for use as a phosphatic fertilizer.

It might be here observed that while I have referred to phosphorous pentoxide ($P_2O_5$) I do not wish to be understood as being limited to such gas alone, since this gas is usually combined with varying amounts of moisture and is often also mechanically mixed with other gases such as are derived from the volatilization of phosphatic material. Therefore it is to be understood that the term phosphorous pentoxide is used in the specification and in the following claims in a general sense and includes this gas and the gas when combined with varying amounts of moisture to produce in effect a mist of phosphoric acid ($H_3PO_4$).

In carrying out my process I preferably connect by any suitable means the gas passage of a phosphatic volatilization furnace to a chamber or retort in which is placed the phosphatic material to be treated. The said chamber is preferably provided with a plurality of oppositely inclined shelves, and mechanical means are furnished to agitate the phosphatic material by forcing the same from shelf to shelf in the atmosphere of the chamber, that is, in an atmosphere of phosphorous pentoxide.

By thus subjecting the phosphatic material directly to the action of phosphorous pentoxide I convert the phosphatic material, that is $Ca_3(PO_4)_2$ to monocalcium phosphate, that is $CaH_4(PO_4)_2$.

I claim:—

1. The method of producing calcium acid phosphate, which consists in directly subjecting finely powdered phosphatic material to the direct action of phosphorous pentoxide and in agitating the phosphatic material in the presence of said gas.

2. The method of producing calcium acid phosphate, which consists in agitating finely powdered phosphoric material in a heated atmosphere of phosphorous pentoxide.

3. The method of producing calcium acid phosphate, which consists in agitating finely powdered phosphatic material in an atmosphere of phosphorous pentoxide at a high temperature.

4. The method of producing calcium acid phosphate which consists in agitating powdered phosphatic material and subjecting the same to the direct action of phosphorous pentoxide produced by the volatilization of the acid constituent of the phosphoric material.

In testimony whereof I affix my signature.

STAPLETON D. GOOCH.